United States Patent [19]

Akutsu et al.

[11] Patent Number: 5,585,627
[45] Date of Patent: Dec. 17, 1996

[54] APPARATUS FOR SCANNING ORIGINAL IMAGE HAVING A PLURALITY OF MIRRORS OF DIFFERENT NATURAL FREQUENCIES

[75] Inventors: Kotaro Akutsu, Souka; Atsushi Takasaki, Tokyo, both of Japan

[73] Assignee: Canon Kabushiki Kaisha, Tokyo, Japan

[21] Appl. No.: 426,847

[22] Filed: Apr. 24, 1995

[30] Foreign Application Priority Data

Apr. 28, 1994 [JP] Japan ................. 6-114690

[51] Int. Cl.⁶ .................. H01J 3/14; H01J 5/16; G03G 15/28
[52] U.S. Cl. .................. 250/234; 250/208.1; 355/233; 359/224
[58] Field of Search .................. 250/208.1, 234, 250/216; 358/474, 494; 355/233, 236; 359/223, 224

[56] References Cited

U.S. PATENT DOCUMENTS

| 5,212,523 | 5/1993 | Ogaiwara et al. | 355/233 |
|---|---|---|---|
| 5,212,582 | 5/1993 | Nelson | 359/224 |
| 5,245,464 | 9/1993 | Jensen | 359/224 |
| 5,295,014 | 3/1994 | Toda | 359/224 |
| 5,329,103 | 7/1994 | Rando | 359/223 |

Primary Examiner—Stephone Allen
Attorney, Agent, or Firm—Fitzpatrick, Cella, Harper & Scinto

[57] ABSTRACT

In an apparatus for scanning an original image by directing light from an original irradiated with a light source to a photoelectric conversion device or a photosensitive member, the natural frequencies of a plurality of mirrors for reflecting the light from the original are set to different values to prevent the plurality of mirrors from vibrating at the same frequency.

13 Claims, 7 Drawing Sheets

CONVENTIONAL APPARATUS

CONVENTIONAL APPARATUS

CONVENTIONAL OPERATION

CONVENTIONAL OPERATION

APPARATUS FOR SCANNING ORIGINAL IMAGE HAVING A PLURALITY OF MIRRORS OF DIFFERENT NATURAL FREQUENCIES

BACKGROUND OF THE INVENTION

1. Field of the Invention

This invention relates to an original scanning apparatus for use in a copying machine or the like and, more particularly, to an original scanning apparatus for directing light from an original to a photoelectric conversion device or a photosensitive member by moving a plurality of mirrors parallel to the original surface.

2. Description of the Related Art

An apparatus such as the one illustrated in FIG. 7 is a conventional original scanning apparatus of this kind.

FIG. 7 is a side view of an original scanning apparatus using a photoelectric conversion device such as a charge coupled device (CCD). An original 105 is illuminated with an original illumination lamp 104. Reflected light from the original 105 is sent to a photoelectric conversion element unit 107 by a first reflecting mirror 101, a second reflecting mirror 102, a third reflecting mirror 103 and a reduction lens 106. The original illumination lamp 104 and the first reflecting mirror 101 are mounted on a first mirror base 108, which is driven with a wire 110 and a pulley 112 to scan the original at a constant speed to the rightward direction as viewed in FIG. 7. The second reflecting mirror 102 and the third reflecting mirror 103 are mounted on a second mirror base 109 through a supporting structure. The second mirror base 109 is driven with the wire 110 and the pulley 112 to move in the same direction as the original illumination lamp 104 and the first reflecting mirror 101 at half the speed of these components, whereby the optical distance between the original 105 and the photoelectric conversion element unit 107 can be constantly maintained.

For high-precision image formation using the above-described original scanning apparatus, it is necessary to always move the moving components at constant speeds through the original scanning period. In the case of an application to a copying machine or the like, the copying magnification in the direction in which original 105 is scanned is adjusted by selecting the scanning speed. A range of rotational speed of a driving motor 111 from a low speed to a high speed about ten times the low speed is required to select the scanning speed in accordance with the desired ratios of enlargement and reduction of original 105. In order to perform scanning immediately after a preceding cycle of scanning, it is necessary to return the original illumination lamp 104 and the first to third reflecting mirrors 101, 102, and 103 to the start position at speeds much higher than the speeds at the time of scanning. To achieve this, motor speed control over a wider range is required. If the apparatus is arranged so as to satisfy these conditions, vibration is transmitted to the reflecting mirrors from, for example, the rotational speed of the driving motor 111 during scanning, across a wide frequency range.

FIG. 8 shows the conventional reflecting mirror structure, particularly the second and third reflecting mirrors 102 and 103, the second mirror base 109 and the supporting structure. As shown in FIG. 8, the second and third mirrors 102 and 103 are formed of the same material, have the same shape and are supported at the same positions in the vicinity of their opposite longitudinal ends by a three-point supporting structure having supporting members 113.

FIG. 9(a) is a graph showing a frequency transmission characteristic of the structural body of the conventional original scanning apparatus, i.e., response of the second and third reflecting mirrors 102 and 303 in the scanning direction in the apparatus affected by a disturbance through the wire 110. As shown in FIG. 9(a), the second and third reflecting mirrors 102 and 103 have the same frequency transmission characteristic. A peak at a frequency of about 200 Hz corresponds to the first bending mode in the longitudinal direction of the mirrors, as shown in FIG. 9(b).

The mirrors 102 and 103 vibrate sympathetically if, during original scanning, the rotational speed of the driving motor 111 at a certain copying magnification becomes equal to a value corresponding to a frequency close to 200 Hz, i.e., the natural frequency of the first bending mode shown in FIG. 9(a). If the amount of deformation caused by this vibration becomes equal to or larger than a certain value, the error in the optical path of the reflected light beam exceeds the allowable range of an element of the photoelectric conversion element unit 107, resulting in a deterioration in image quality; i.e., a pixel misalignment.

In the conventional reflecting mirror structure described above, such a deterioration in image quality may occur because the amounts of deformations of the second and third reflecting mirrors 102 and 103 are maximized at the same frequency.

SUMMARY OF THE INVENTION

In view of the above-described problem, an object of the present invention is to provide an original scanning apparatus having high original scanning accuracy.

Another object of the present invention is to provide an original scanning apparatus capable of preventing sympathetic vibration of a plurality of mirrors when an original is scanned.

To achieve these objects, according to the present invention, there is provided an original scanning apparatus comprising a light source for illuminating an original, a plurality of mirrors for reflecting light from the original illuminated with the light source, movable supporting means for supporting the plurality of mirrors, and a drive source for moving the supporting means, wherein the plurality of mirrors differ from each other in natural frequency when they are being supported by the supporting means.

These and other objects, features and advantages of the present invention will become apparent from the following detailed description of the invention made with reference to the accompanying drawings.

DESCRIPTION OF THE PREFERRED EMBODIMENTS

The preferred embodiments of the present invention will be described below with reference to the accompanying drawings.

First Embodiment

The first embodiment of the present invention will be described in which an original scanning apparatus in accordance with the present invention is applied to a multicolor copying machine.

Figure 1:
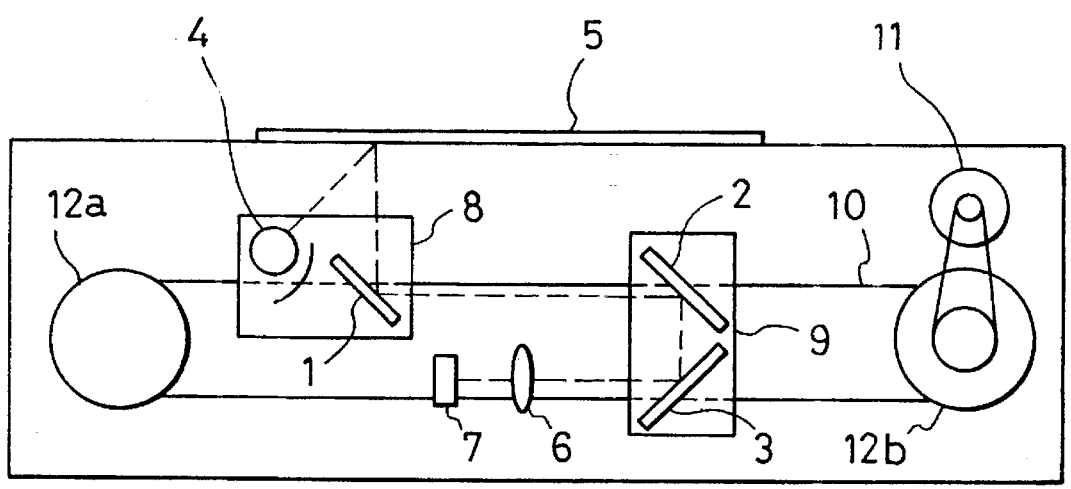
FIG. 1 is a schematic diagram of an original scanning apparatus which represents a first embodiment of the present invention.

FIG. 1 is a schematic side view of an original scanning apparatus for use in a color copying machine. An original 5 is irradiated with an original illumination lamp 4 provided as an illumination means. Reflected light from the original 5 is sent to a photoelectric conversion element unit 7 by a first reflecting mirror 1, a second reflecting mirror 2, a third reflecting mirror 3 and a reduction lens 6. The original illumination lamp 4 and the first reflecting mirror 1 are mounted on a first mirror base (first supporting means) 8 provided as a moving base. The first mirror base 8 is driven with a wire 10 and pulleys 12a and 12b to scan the original at a constant speed in the rightward direction as viewed in FIG. 1. The second reflecting mirror 2 and the third reflecting mirror 3 are mounted on a second mirror base (second supporting means) 9, i.e., a second moving base, with fixing members 13. The second mirror base 9 is driven with the wire 10 and the pulleys 12a and 12b to move in the same direction as the original illumination lamp 4 and the first reflecting mirror 1 at half the speed of these components, whereby the optical distance between the original 5 and the photoelectric conversion element unit 7 can be constantly maintained.

The color copying machine using an electrophotography system forms a full-color image by superposing toners of four colors: cyan, magenta, yellow and black, on a recording material such as a sheet of paper. In the process of copying in this manner, each of four steps of transferring the four colors of toners to the recording material is performed after scanning the original for each of the four colors. Therefore, high-precision positioning is required for each of the four scanning operations. A low-priced stepping motor capable of high-precision positioning and speed control is ordinarily used as a driving motor 11 for driving the original scanning apparatus.

However, the stepping motor is characterized by discontinuous operation and therefore acts as a vibration source particularly at a driving frequency, integer-multiples of the driving frequency and one over integer-multiples of the driving frequency, even when speed-controlled. Also, different copying magnifications in the scanning direction (direction of movement of the supporting means) are achieved by changing the scanning speed of the original 5. A range of rotational speed of the driving motor 11 from a low speed to a high speed of about ten times the low speed is required to select the scanning speed in accordance with the desired ratios of enlargement and reduction of original 5. In order to perform scanning immediately after a preceding cycle of scanning, it is necessary to return the original illumination lamp 4 and the first to third reflecting mirrors 1, 2, and 3 to the start position at speeds much higher than the speeds at the time of scanning. For this effect, a control of the motor speed in a wider range is required. Therefore, the vibration source that depends upon the driving frequency of the stepping motor has a wide frequency range. Then, it is ideal to set the natural frequency of the structural body of the original scanning apparatus including the reflecting mirrors out of the frequency range of the vibration source. However, this is difficult to realize.

Figure 2A:
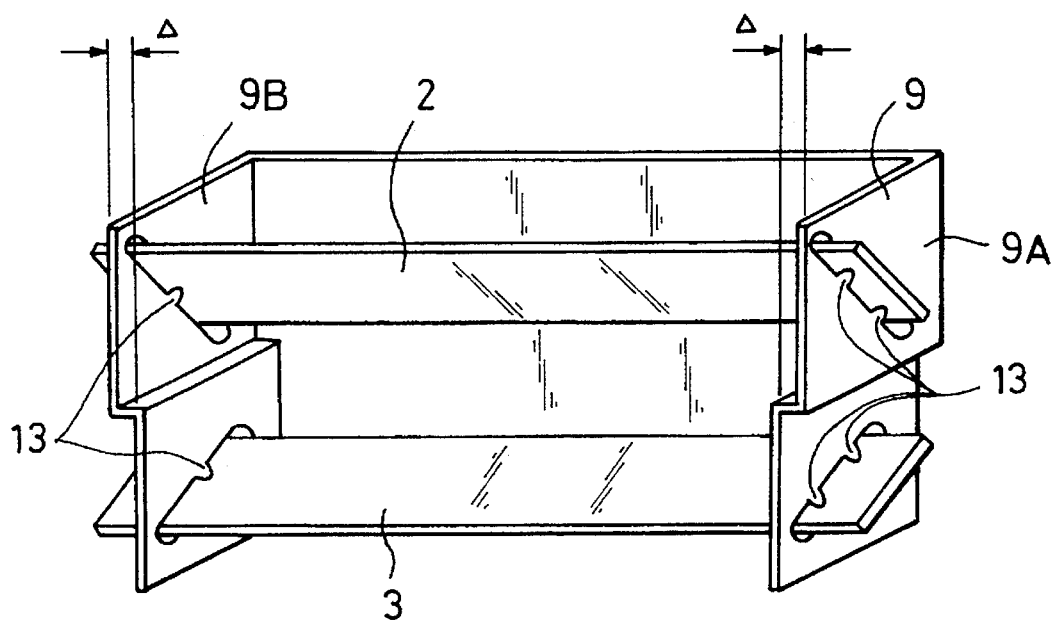
FIG. 2(a) is a perspective view of a reflecting mirror structure of the original scanning apparatus shown in FIG. 1.

FIG. 2(a) is a perspective view of the second reflecting mirror 2, the third reflecting mirror 3, the second mirror base 9 and a structure for supporting the mirrors in the original scanning apparatus of this embodiment.

The second and third reflecting mirrors 2 and 3 are formed of the same material and have the same shape, as in the case of the conventional arrangement. The second mirror base 9 has a pair of plate portions 9A and 9B on which right and left portions of the second and third reflecting mirrors 2 and 3 are supported.

The third reflecting mirror 3 is supported at positions in the vicinity of its longitudinal-direction opposite ends by fixing members 13 in a three-point support manner, as in the case of the conventional arrangement. That is, the plate portion 9A supports the mirror at two points while plate portion 9B supports the mirror at one point.

On the other hand, the second reflecting mirror 2 is supported in a three-point support manner at positions outwardly shifted by a distance Δ from the supporting positions in the conventional arrangement. Accordingly, each of the pair of plate portions 9A and 9B is stepped by the distance Δ, as shown in FIG. 2 (a).

Figure 2B:
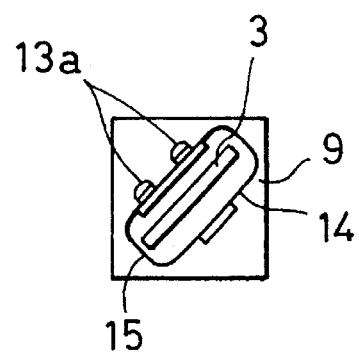
FIGS. 2(b) and 2(c) are schematic diagrams of a supporting structure in the structure shown in FIG. 2(a)
Figure 2C:
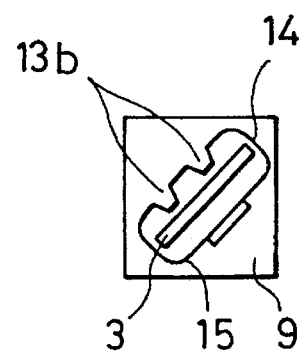

FIGS. 2 (b) and 2 (c) show examples of the supporting structure. FIGS. 2 (b) and 2 (c) are each a side view of plate portion 9A of the second mirror base 9 with the third reflecting mirror 3 inserted therein. The second reflecting mirror 2 is supported in a like manner. Referring to FIG. 2 (b), the supporting structure is such that the third reflecting mirror 3 is pinched between screws 13a and a plate spring 14 provided as fixing members at a mirror insertion slit 15 formed in one side plate of the second mirror base 9, and the angle of the mirror can be adjusted easily. Angle adjustment of only one of the two mirrors may suffice. Accordingly, where the third reflecting mirror 3 is supported by the supporting structure in FIG. 2(b), the supporting structure for the second reflecting mirror 2 may be simplified by forming a mirror insertion slit 15 of the side plate of the second mirror base 9 with projections 13b such as those shown in FIG. 2(c) used as fixing members instead of screws. Of course, the second reflecting mirror may be supported by an adjustable supporting structure, while the third reflecting mirror 3 is supported by a nonadjustable supporting structure.

Figure 3:
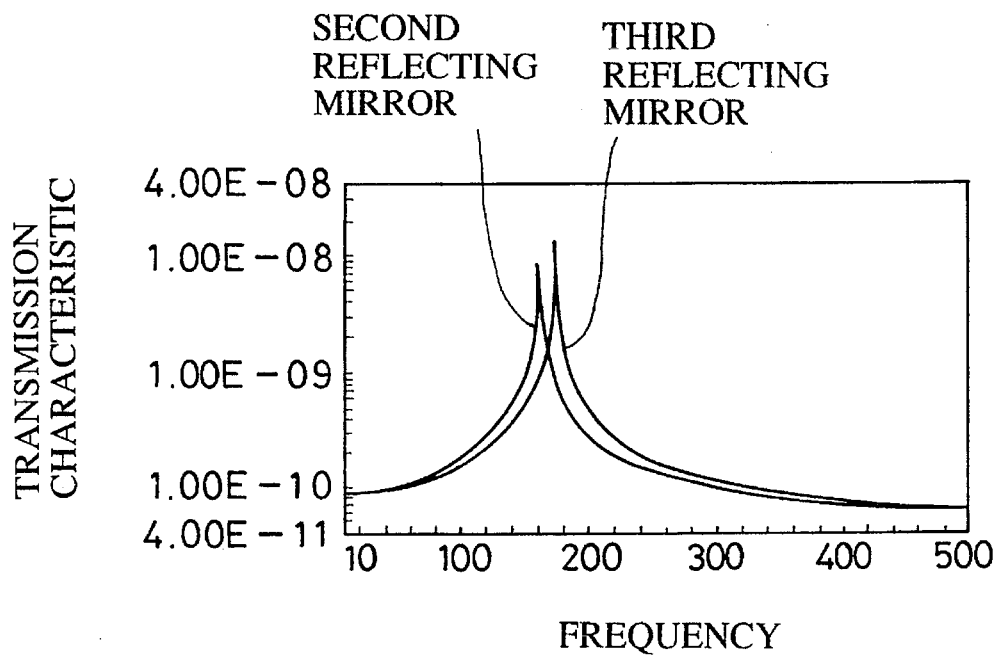
FIG. 3 is a graph showing frequency characteristics of the reflecting mirror structure in accordance with the first embodiment of the invention.

FIG. 3 is a graph showing a frequency transmission characteristic of the structural body of the above-described original scanning apparatus, i.e., response of the second and third reflecting mirrors 2 and 3 in the scanning direction in the apparatus when a disturbance is input through the wire 10. The third reflection mirror 3 has the same frequency characteristic as that of the mirrors in the conventional apparatus. The second reflecting mirror 2 has a frequency characteristic different from that of the third reflecting mirror 3 since the distance between the supporting points in the longitudinal direction of the mirror is increased by 2Δ. At the frequency corresponding to the peak transmission characteristic value of the third reflecting mirror 3, the transmission characteristic value of the second reflecting mirror 2 is about 1/10 of that of the third reflecting mirror 3. That is, even if the third reflecting mirror 3 vibrates in the first bending mode as in the conventional apparatus, the second reflecting mirror 2 vibrates only with an amplitude of about 1/10 of the amplitude of the vibration of the third reflecting mirror 3, since the second and third reflecting mirrors 2 and 3 supported by the supporting structure shown in FIGS. 2(a) through 2(c) have different natural frequencies.

Figure 4:
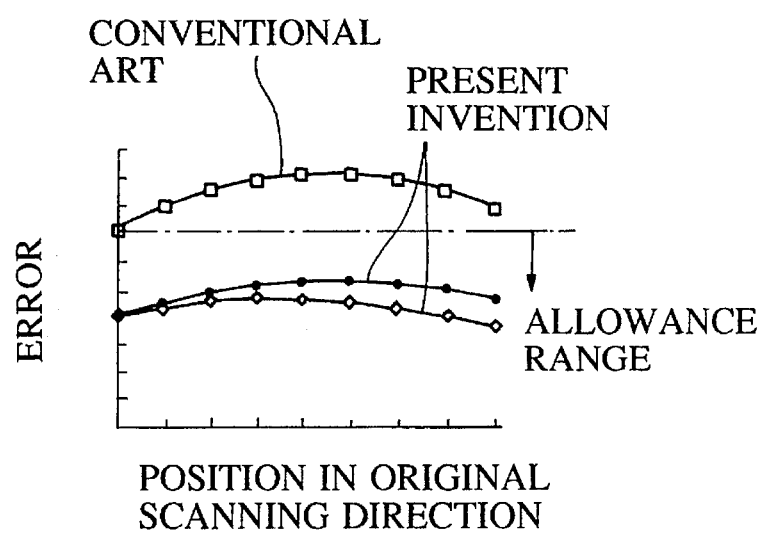
FIG. 4 is a graph showing the result of evaluation of optical path error in the first embodiment of the invention.

An experiment was performed to evaluate optical path errors when the first, second and third reflecting mirrors 1, 2 and 3 vibrated in the first bending mode. The result of this experiment is shown in FIG. 4. FIG. 4 shows errors caused when the stepping motor is driven to excite the natural vibrations of the second and third reflecting mirrors 2 and 3 in the conventional structure, and errors caused when the stepping motor is driven to excite the natural vibration of the third reflecting mirror 3 in the structure of the present invention and when the stepping motor is driven to excite the natural vibration of the second reflecting mirror 2. The abscissa represents the position along the original scanning direction, while the ordinate represents the optical path error. An allowable range of error is indicated by the area beneath the dot-dash line. In the conventional structure, the optical path error slightly exceeded the limit of the allowable range and reduced image quality. In contrast, in the structure of the present invention, the optical path error was within the allowable range and there was no deterioration in image quality.

Other Embodiments (1) In the first embodiment, the distance between the supporting points on the second reflecting mirror 2 in the longitudinal direction of the same is increased by 2Δ by outwardly shifting the supporting points relative to those on the third reflecting mirror 3. However, the arrangement may alternatively be such that the distance between the supporting points on the third reflecting mirror 3 is increased by 2Δ relative to the distance between the supporting points on the second reflecting mirror 2.

Figure 5:
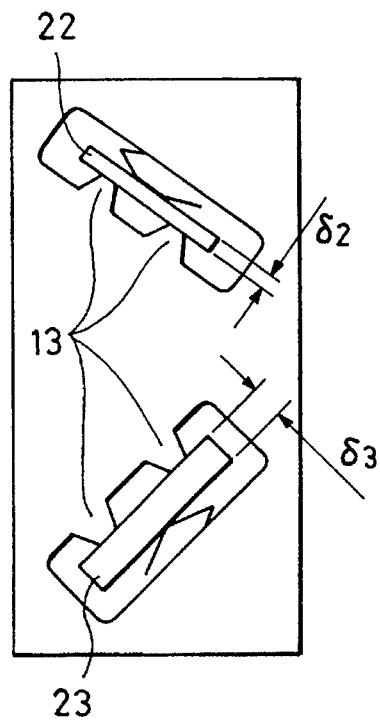
FIG. 5 is a schematic diagram of a reflecting mirror structure of another embodiment of the present invention.

(2) The second and third reflecting mirrors, having the same shape in the first embodiment, may alternatively be formed so as to differ from each other in thickness, as shown in FIG. 5. That is, to set the natural frequencies of the plurality of mirrors in the state of being supported by the supporting means to different values, the states of the mirrors not being supported by the supporting means, i.e., the natural frequencies of the mirrors in a free state, may be varied.

Figure 6:
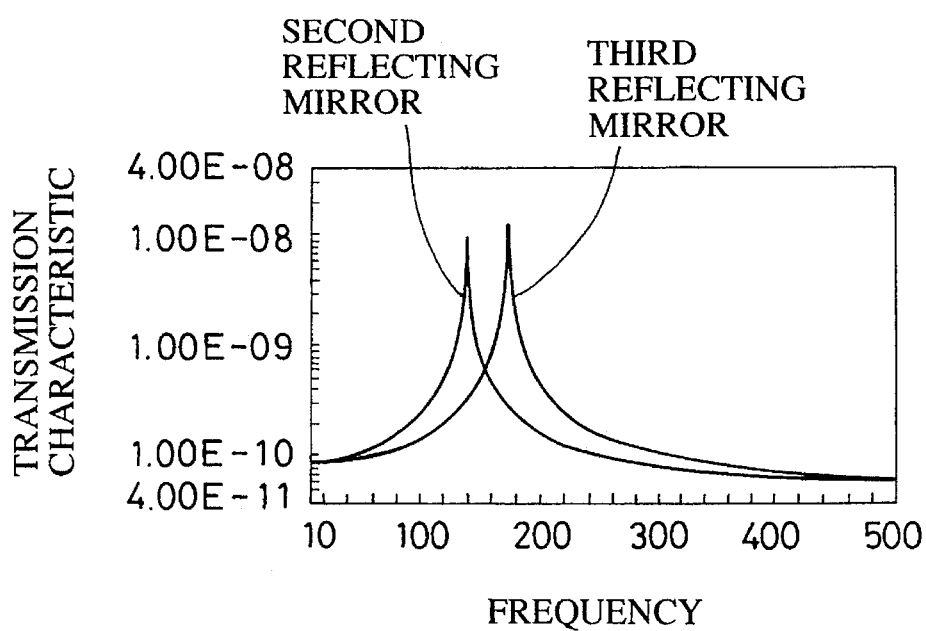
FIG. 6 is a graph showing frequency characteristics of the reflecting mirror structure shown in FIG. 5.
Figure 7:
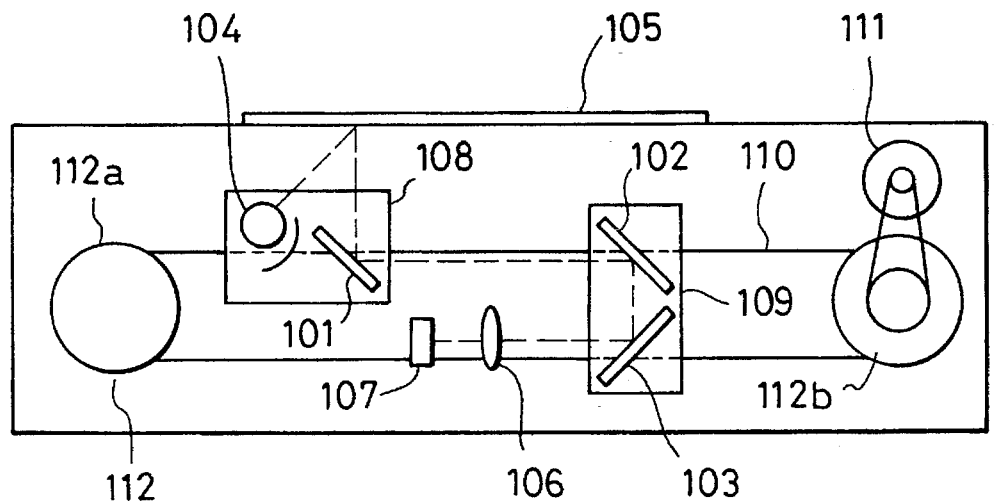
FIG. 7 is a schematic diagram of a conventional original scanning apparatus.
Figure 8:
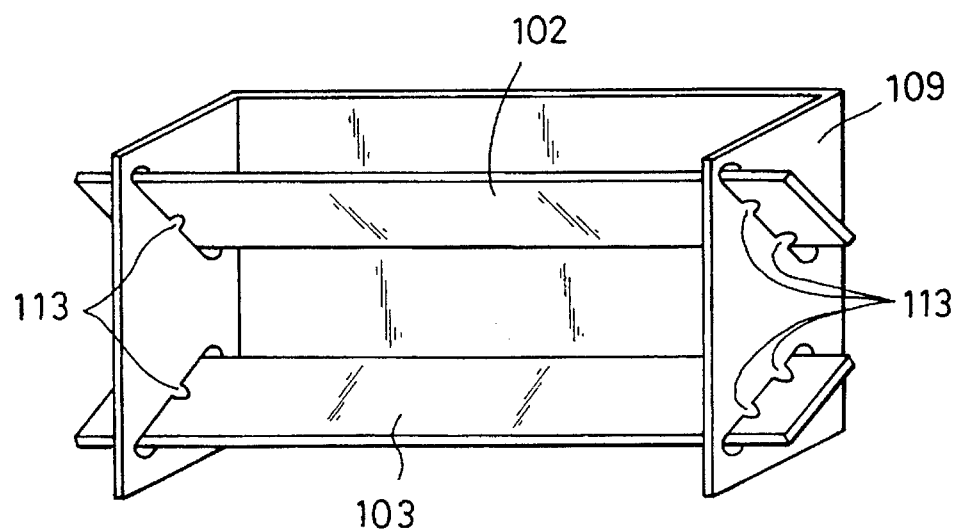
FIG. 8 is a perspective view of a reflecting mirror structure of the original scanning apparatus shown in FIG. 7.
Figure 9A:
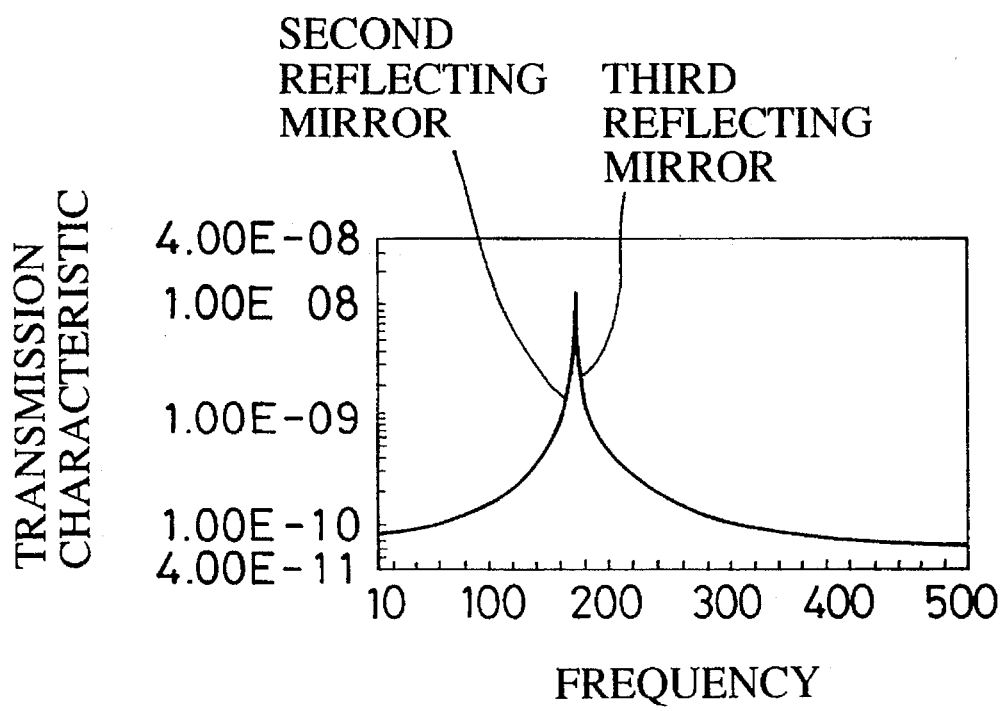
FIG. 9(a) is a graph showing a frequency characteristic of the conventional reflecting mirror structure.
Figure 9B:
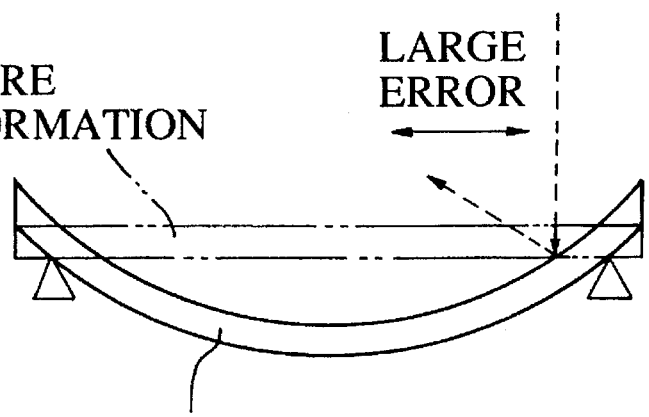
FIG. 9(b) is a schematic diagram of deformation of the reflecting mirror in the first bending mode.

Referring to FIG. 5, a third reflecting mirror 23 has the same thickness δ3 as in the conventional arrangement but a second reflecting mirror 22 has a smaller thickness δ2. The supporting points on the second and third reflecting mirrors 22 and 23 are the same as those in the conventional arrangement. FIG. 6 is a graph showing a frequency transmission characteristic of the structural body of an original scanning apparatus constructed in this manner, i.e., response of the second and third reflecting mirrors 22 and 23 in the scanning direction in the apparatus when a disturbance is input through the wire 10. The third reflection mirror 23 has the same frequency characteristic as that of the mirrors in the conventional apparatus. The second reflecting mirror 22 has a frequency characteristic different from that of the third reflecting mirror 23 since its thickness is reduced. At the frequency corresponding to the peak transmission characteristic value of the third reflecting mirror 23, the transmission characteristic value of the second reflecting mirror 22 is about 1/10 of that of the third reflecting mirror 23. That is, even if the third reflecting mirror 23 vibrates in the first bending mode as in the conventional apparatus, the second reflecting mirror 22 vibrates only with an amplitude of about 1/10 of the amplitude of the third reflecting mirror 23.

To vary the natural frequencies of the mirrors in a free state, the following means may also be used.

(3) Second and third reflecting mirrors 22 and 23, which are formed of the same material in the above-described embodiment, may alternatively be formed of materials differing in elastic modulus or density.

(4) Another arrangement, not shown, may be adopted in which the supported positions of at least one of second and third reflecting mirrors 22 and 23 are variable. This arrangement is effective if the supported positions can be changed along the longitudinal direction of the mirror.

The apparatus of the present invention has the above-described construction and function and is characterized in that the natural frequencies of the plurality of mirrors supported by the supporting means are different from each other, so that the mirrors do not vibrate sympathetically and the amplitudes of the mirrors are not maximized simultaneously. It is therefore possible to limit the optical path error of the reflected light beam formed by the mirrors within the allowable range and to prevent a deterioration in image quality; i.e., pixel misalignment.

Figure 10:
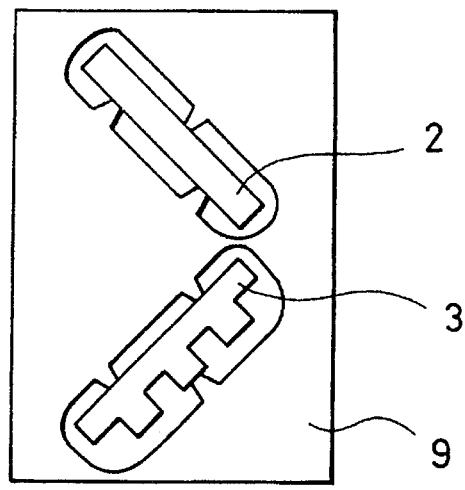
FIG. 10 is a schematic diagram of a reflecting mirror structure of yet another embodiment of the present invention.

It is possible to vary the natural frequencies of the second and the third reflecting mirrors in the first bending mode in a simple manner by setting the positions at which the supporting members support the second reflecting mirror asymmetrically with the positions at which the third reflecting mirror is supported or by changing the shape (FIG. 10), the thickness or the material of the second and third mirrors.

In the first embodiment, glass (having a density of 2.5 g/cm$^3$ and a Young's modulus of 80×10$^3$ N/mm$^2$) is used as the material of the mirrors. However, alumina (having a density of 3.8 g/cm$^3$ and a Young's modulus of 400×10$^3$ N/mm$^2$) may be used instead of glass.

Figure 11:
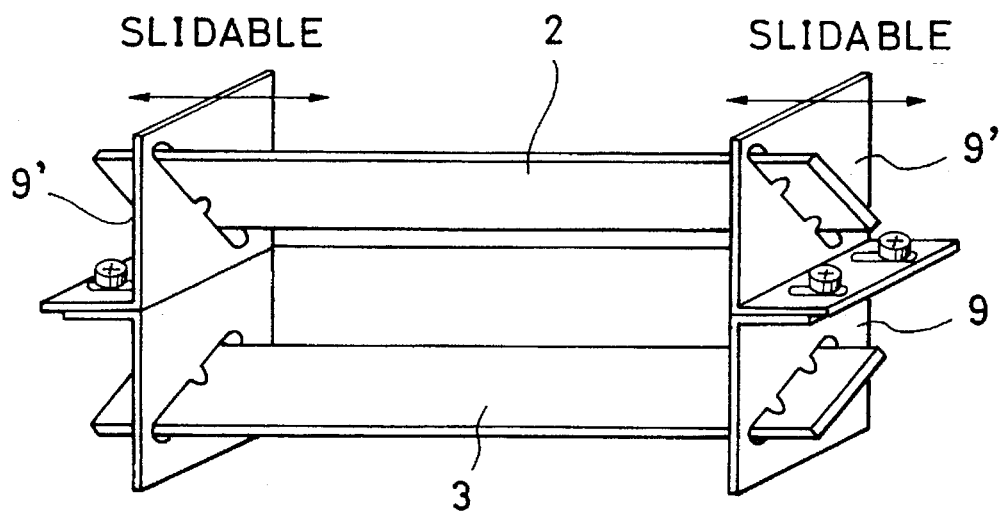
FIG. 11 is a perspective view of a reflecting mirror structure of still another embodiment of the present invention.

The apparatus may be arranged so that the supported positions of at least one of the second and third reflecting mirror are variable (FIG. 11), thereby making it easy to select the natural frequency in the first bending mode with respect to vibrations determined by various factors and changes with respect to time to limit the resulting vibration.

Since the supported positions are variable in the longitudinal direction of the mirror, the accuracy and freedom of adjustment are increased, so that vibration can be limited more easily.

The embodiments of the present invention have been described as an original scanning apparatus which reads light from an original illuminated with a light source by using a photoelectric conversion device such as a CCD. However, the present invention can also be applied to a type of original scanning apparatus which directly irradiate a photosensitive member of an electrophotography system with light from an original.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An original scanning apparatus comprising:

a light source for illuminating an original;

a plurality of mirrors for reflecting light from the original illuminated with said light source; and supporting means for supporting said plurality of mirrors at left and right positions, said supporting means comprising an adjusting mechanism for adjusting a distance between the left position and the right position of said supporting means of at least one of said plurality of mirrors.

2. An apparatus according to claim 1, wherein said plurality of mirrors differ from each other in natural frequency in the first bending mode when said plurality of mirrors are supported by said supporting means.

3. An apparatus according to claim 1, wherein each of said plurality of mirrors have different natural frequencies when each of said plurality of mirrors is in a free state.

4. An apparatus according to claim 3, wherein the thickness of each of said plurality of mirrors is different.

5. An apparatus according to claim 3, wherein the density of each of said plurality of mirrors is different.

6. An apparatus according to claim 3, wherein each of said plurality of mirrors comprise different materials.

7. An apparatus according to claim 3, wherein each of said plurality of mirrors comprise different shapes.

8. An apparatus according to claim 3, wherein each of said plurality of mirrors has a different length, measured in a direction perpendicular to the direction of movement of said supporting means.

9. An apparatus according to claim 1, wherein said drive source comprises a stepping motor.

10. An apparatus according to claim 1, wherein said plurality of mirrors comprise two mirrors for reflecting the light from the original through an angle of 180°.

11. An apparatus according to claim 1, further comprising a photoelectric conversion element which receives light reflected by said plurality of mirrors.

12. An apparatus according to claim 1, further comprising a separate mirror for sending the light from the original to a first one of said plurality of mirrors, and separate supporting means for supporting said separate mirror and said light source, said separate supporting means being different from said supporting means for supporting said plurality of mirrors.

13. An apparatus according to claim 12, wherein when the original is scanned, said supporting means supporting said plurality of mirrors moves at half the speed of said separate supporting means supporting said light source and said separate mirror.

* * * * *

UNITED STATES PATENT AND TRADEMARK OFFICE
CERTIFICATE OF CORRECTION

PATENT NO.  : 5,585,627
DATED       : December 17, 1996
INVENTOR(S) : KOTARO AKUTSU, ET AL.

It is certified that error appears in the above-indentified patent and that said Letters Patent is hereby corrected as shown below:

COLUMN 2:

Line 4, "303" should read --103--.

COLUMN 7:

Line 33, "have different natural frequencies" should read --has a different natural frequency--.

COLUMN 8:

Line 6, "comprise different materials" should read --comprises a different material--; and
Line 8, "comprise different shapes" should read --comprises a different shape--.

Signed and Sealed this

Twelfth Day of August, 1997

Attest:

BRUCE LEHMAN

Attesting Officer

Commissioner of Patents and Trademarks